US010233829B2

(12) United States Patent
Burnham et al.

(10) Patent No.: US 10,233,829 B2
(45) Date of Patent: Mar. 19, 2019

(54) CONTROL SYSTEM FOR A GENERATOR

(71) Applicants: Randall Scott Burnham, Maple Grove, MN (US); David Jon Renken, Prior Lake, MN (US); Erich Albert Lucht, Arden Hills, MN (US); Cullen Evan Hall, Savage, MN (US); Alec Jeffery, Minneapolis, MN (US); Cesar Armengod Villalba, Odense (DK)

(72) Inventors: Randall Scott Burnham, Maple Grove, MN (US); David Jon Renken, Prior Lake, MN (US); Erich Albert Lucht, Arden Hills, MN (US); Cullen Evan Hall, Savage, MN (US); Alec Jeffery, Minneapolis, MN (US); Cesar Armengod Villalba, Odense (DK)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 15/988,545

(22) Filed: May 24, 2018

(65) Prior Publication Data
US 2018/0306105 A1    Oct. 25, 2018

Related U.S. Application Data

(63) Continuation of application No. 13/804,016, filed on Mar. 14, 2013, now Pat. No. 9,995,210.
(Continued)

(51) Int. Cl.
*F02B 63/04* (2006.01)
*B60H 1/00* (2006.01)
(Continued)

(52) U.S. Cl.
CPC ......... *F02B 63/04* (2013.01); *B60H 1/00014* (2013.01); *B60H 1/00428* (2013.01);
(Continued)

(58) Field of Classification Search
CPC .......... F02B 63/04; F02B 77/13; F02B 75/16; F02B 63/0444; F02D 41/266; F02D 29/06;
(Continued)

(56) References Cited

U.S. PATENT DOCUMENTS 4,013,056 A    3/1977  Yamaki et al.
4,991,400 A    2/1991  Wilkinson
(Continued)

FOREIGN PATENT DOCUMENTS

CN       1795358       6/2006
CN       101326085    12/2008
(Continued)

OTHER PUBLICATIONS

European Search Report issued in European Application No. 13764525.5 dated Oct. 26, 2015 (8 pages).
(Continued)

*Primary Examiner* — Jacob Amick
*Assistant Examiner* — Charles Brauch
(74) *Attorney, Agent, or Firm* — Hamre, Schumann, Mueller & Larson, P.C.

(57) ABSTRACT

A generator set for a transport refrigeration unit that is operable at a first frequency and a second frequency. The generator set includes a generator and a prime mover. The generator set is controlled by an electronic control unit (ECU) that is coupled to a controller. The ECU is configured to monitor the engine operation condition to obtain an engine operation condition value; whereas the controller is configured to receive the engine operation condition value
(Continued)

and compare the value with an engine operation condition threshold. When the engine operation condition value, for example, exceeds the engine operation condition threshold, the controller instructs the ECU to operate the engine at a first speed; and when the engine operation condition value, for example, is below the engine operation condition threshold, the controller instructs the ECU to operate the engine at a second speed that is slower than the first speed.

20 Claims, 6 Drawing Sheets

Related U.S. Application Data

(60) Provisional application No. 61/615,019, filed on Mar. 23, 2012.

(51) Int. Cl.
  *F02D 31/00* (2006.01)
  *F02D 29/06* (2006.01)
  *F02D 41/26* (2006.01)
  *F02B 77/13* (2006.01)
  *F02B 75/16* (2006.01)
  *F02D 41/18* (2006.01)
  *B60H 1/32* (2006.01)

(52) U.S. Cl.
  CPC ............ *F02D 29/06* (2013.01); *F02D 31/001* (2013.01); *F02D 41/266* (2013.01); *B60H 1/3232* (2013.01); *F02B 63/044* (2013.01); *F02B 75/16* (2013.01); *F02B 77/13* (2013.01); *F02B 2063/045* (2013.01); *F02D 31/007* (2013.01); *F02D 41/18* (2013.01); *F02D 2200/0614* (2013.01); *F02D 2200/101* (2013.01); *F02D 2200/1002* (2013.01); *Y02T 10/88* (2013.01)

(58) Field of Classification Search
  CPC ................ F02D 31/001; F02D 31/007; F02D 2200/061; F02D 41/18; F02D 2200/1002; F02D 2200/101; B60H 1/00014; B60H 1/00428; B60H 1/3232
  See application file for complete search history.

(56) References Cited

U.S. PATENT DOCUMENTS

| | | | |
|---|---|---|---|
| 5,117,682 A | 6/1992 | Amano | |
| 5,186,015 A | 2/1993 | Roehrich et al. | |
| 5,563,802 A | 10/1996 | Plahn et al. | |
| 5,706,199 A * | 1/1998 | Wilson | B60K 31/00 180/173 |
| 5,784,267 A | 7/1998 | Koenig et al. | |
| 5,724,941 A | 10/1998 | Suzuki et al. | |
| 5,909,720 A * | 6/1999 | Yamaoka | B60K 6/365 123/179.3 |
| 5,996,367 A | 12/1999 | Hamish | |
| 6,226,998 B1 | 5/2001 | Reason et al. | |
| 6,318,100 B1 | 11/2001 | Brendel et al. | |
| 6,321,549 B1 | 11/2001 | Reason et al. | |
| 6,664,651 B1 | 12/2003 | Kotre et al. | |
| 6,952,057 B2 | 10/2005 | Tajima et al. | |
| 7,043,927 B2 | 5/2006 | Burchill et al. | |
| 7,690,213 B2 | 4/2010 | Inaba | |
| 7,743,616 B2 | 6/2010 | Renken et al. | |
| 7,878,013 B2 | 2/2011 | Matsuno et al. | |
| 8,824,066 B2 | 9/2014 | Weng | |
| 9,206,753 B2 * | 12/2015 | Calva | F02D 17/02 |
| 2007/0251472 A1 | 11/2007 | Fiveland | |
| 2009/0023545 A1 | 1/2009 | Beaudoin | |
| 2009/0120699 A1 * | 5/2009 | Suzuki | B60L 15/2045 180/65.265 |
| 2012/0053809 A1 | 3/2012 | Bungo | |

FOREIGN PATENT DOCUMENTS

| | | |
|---|---|---|
| EP | 1038705 | 9/2000 |
| EP | 1912327 | 4/2008 |
| JP | 2006170037 | 6/2006 |

OTHER PUBLICATIONS

First Chinese office Action issued in Chinese Application No. 201380015824.X dated Jun. 1, 2016 (12 pages).
Second Chinese office Action issued in Chinese Application No. 201380015824.X dated Jan. 26, 2017 (5 pages).
International Search Report issued in International Application No. PCT/US2013/033510 dated Jul. 23, 2013 (3 pages).
Written Opinion issued in International Application No. PCT/US2013/033510 dated Jul. 23, 2013 (5 pages).

* cited by examiner

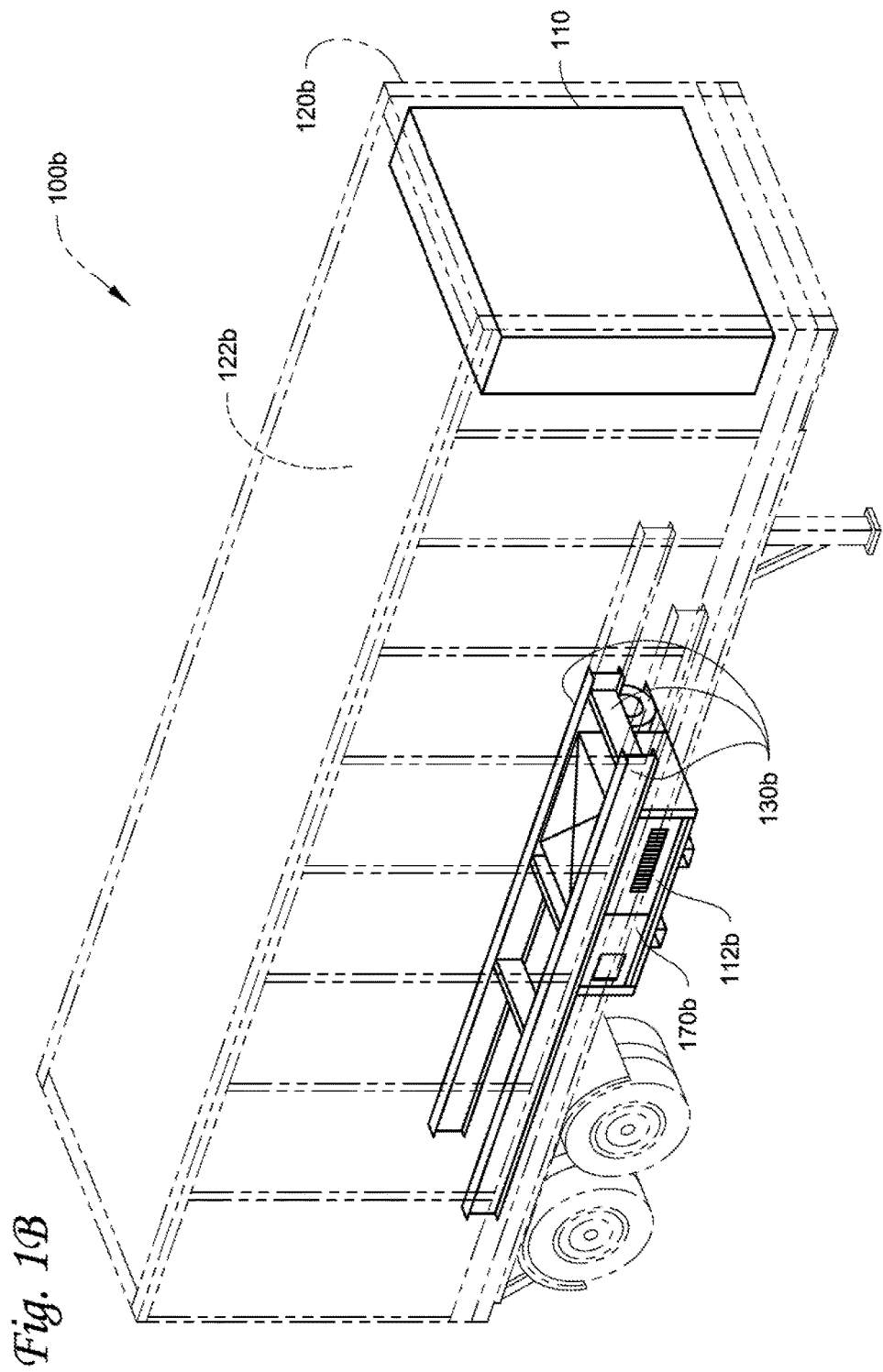

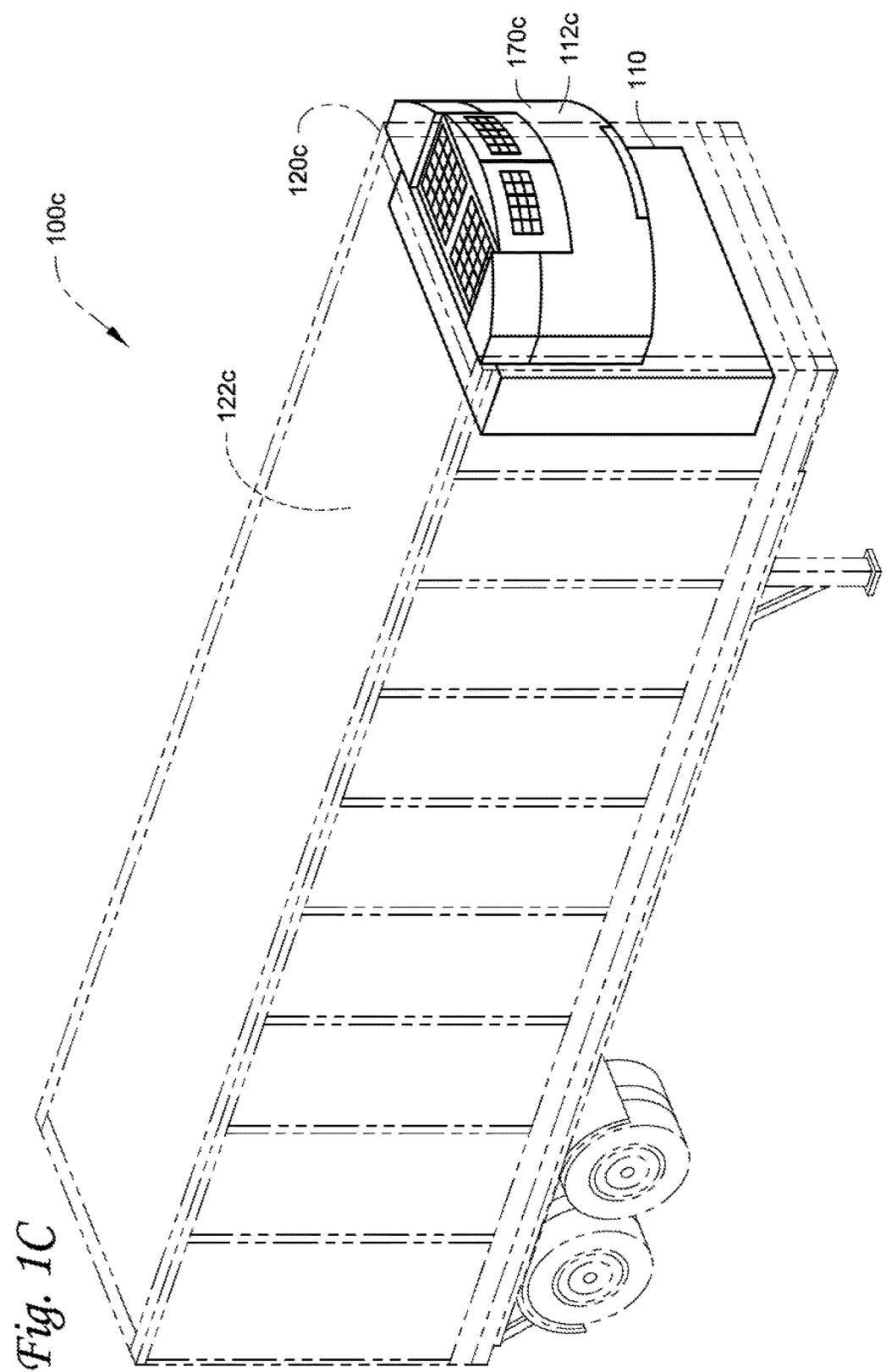

CONTROL SYSTEM FOR A GENERATOR

PRIORITY

This application claims the benefit of U.S. Provisional Application No. 61/615,019, entitled "CONTROL SYSTEM FOR A GENERATOR", filed Mar. 23, 2012, which is incorporated herein by reference in its entirety.

FIELD OF TECHNOLOGY

The embodiments disclosed herein generally relate to a generator set for a transport refrigeration system. More specifically, the embodiments disclosed here relates to a control system for a multi-speed generator set that may be configured to change a speed of the generator set based on parameters obtained by an electronic control unit.

BACKGROUND

Existing transport refrigeration systems are used to cool containers, trailers, and other similar transport units. Modern containers may be efficiently stacked for shipment by ship or rail. When containers are shipped by a truck, a single container is placed on a container chassis. When cargo in the container includes, for example, perishable products (e.g. food product, flowers, etc.), the temperature of the container may be controlled to limit loss of the cargo during shipment.

Some existing transport units may include a generator set that supplies power to temperature-controlling components of the transport refrigeration system. These generator sets are typically attached directly to the container or container chassis, and include an engine to power a generator, as well as a fuel container to supply fuel to the generator sets.

Generator sets may operate at a single, relatively constant speed to produce a relatively constant output frequency (e.g., 60 Hz) and one or more output voltages (e.g., ~230/460 VAC, etc.). These generator sets may operate at the same single speed regardless of the load on the transport refrigeration system. Therefore, the transport refrigerant system may not operate at the most fuel efficient condition for a particular load of the transport refrigeration system. During an extended period of time without inspection by, for example, transportation workers, these generator sets may use up the fuel in the fuel container. The out-of-fuel condition can cause loss of power to the transport refrigeration system, and may result in loss of the perishable cargo. This is especially true when ambient temperature conditions are relatively hot or relatively cold.

SUMMARY

Embodiments to reduce fuel consumption can help extend a period of time that a generator set can operate, and consequently can reduce a chance of the occurrence of an out-of-fuel condition. Embodiments that reduce the fuel consumption may also help extend the service life of the generator set and help reduce a noise level of the generator set.

Embodiments described herein provide a generator set for a transport refrigeration unit that is operable at a first frequency and a second frequency. The generator set is configured to provide electrical power to the transport refrigeration unit. The generator set may be enclosed in a housing. The generator set may include a prime mover coupled to a generator. In some embodiments, the prime mover may be configured to selectively drive the generator in at least a first non-zero speed and a second non-zero speed.

In some embodiments, the generator set may be controlled by an electronic control unit that is coupled to a controller. The electronic control unit may be configured to monitor engine operation conditions and provide an engine operation condition value to reflect the engine operation condition, and the controller may be configured to receive the engine operation condition value and compare the engine operation condition value with a predetermined engine operation condition threshold. When the engine operation condition value exceeds the engine operation condition threshold, the controller may instruct the electronic control unit to operate the prime mover at a first speed; and when the value is smaller than the threshold value, the controller may instruct the electronic control unit to operate the engine at a second speed that is slower than the first speed.

Another embodiment provides a method of controlling a generator set for a transport refrigeration unit that is operable at a first frequency and a second frequency. The method may include monitoring the engine operation condition to obtain an engine operation condition value. The method also may include comparing the engine operation condition value with a predetermined engine operation condition threshold. The method may further include instructing the engine to operate at a first speed when the engine operation condition value exceeds the engine operation condition threshold; and instructing the engine to operate at a second speed that is lower than the first speed when the engine operation condition value is below the engine operation condition threshold.

The engine operation condition value may be an amount of fuel delivered to the engine, an engine shaft speed, and/or air intake flow.

Other aspects of the invention will become apparent by consideration of the de tailed description and accompanying drawings.

BRIEF DESCRIPTION OF THE DRAWINGS

FIGS. 1A to 1C illustrate side perspective views of temperature controlled transport units. FIG. 1A illustrates a temperature controlled transport unit with a generator set mounted on a side of a chassis. FIG. 1B illustrates a temperature controlled transport unit with a generator set mounted on a bottom of a chassis. FIG. 1C illustrates a temperature controlled transport unit with a front mounted generator set.

DETAILED DESCRIPTION

Some transport units include a generator set to supply power to a transport refrigeration system of a transport unit, so that the transport unit can maintain a temperature inside the transport units. The transport unit usually includes a fuel container to provide fuel for a prime mover of the generator set. Methods and systems that help increase fuel efficiency of the prime mover can reduce fuel consumption of the prime mover and therefore may help extend a period of time that the generator can be operated without refilling the fuel container, and may also help reduce the fuel consumption and environment impact such as noise, as well as extend the service lives of the engine and the refrigeration system.

In the following description of the illustrated embodiments, embodiments to help increase the fuel efficiency are disclosed. The embodiments described herein can be configured to monitor an operation condition of an engine and regulate the engine speed of the generator set according to the engine operation condition. In one embodiment, the engine load may be monitored by an electronic control unit. When the engine load is low, the engine can be operated at a relatively low speed; when the engine load is high, the engine can be operated at a relatively high speed.

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that the phraseology and terminology used herein is for the purpose of description and should not be regarded as limiting.

Figure 1A:
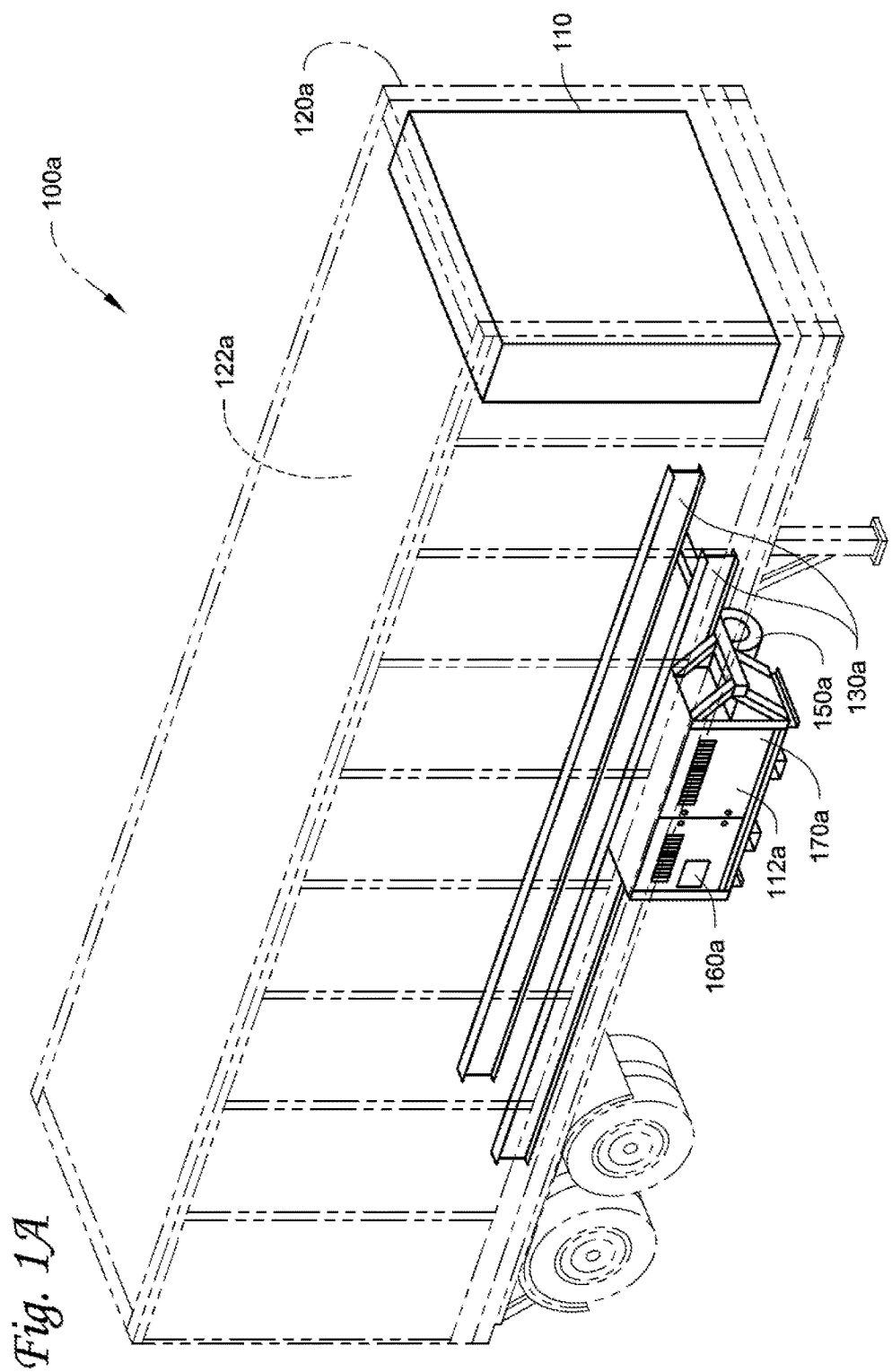

FIGS. 1A to 1C illustrate side perspective views of temperature controlled transport units 100a, 100b and 100c respectively with a transport refrigeration system 110. The transport refrigeration system 110 may be positioned at a front end 120a, 120b, 120c of the transport units 100a, 100b, and 100c respectively. The transport refrigerant system 110 may draw power from a generator set 112a, 112b and 112c respectively.

Figure 2A:
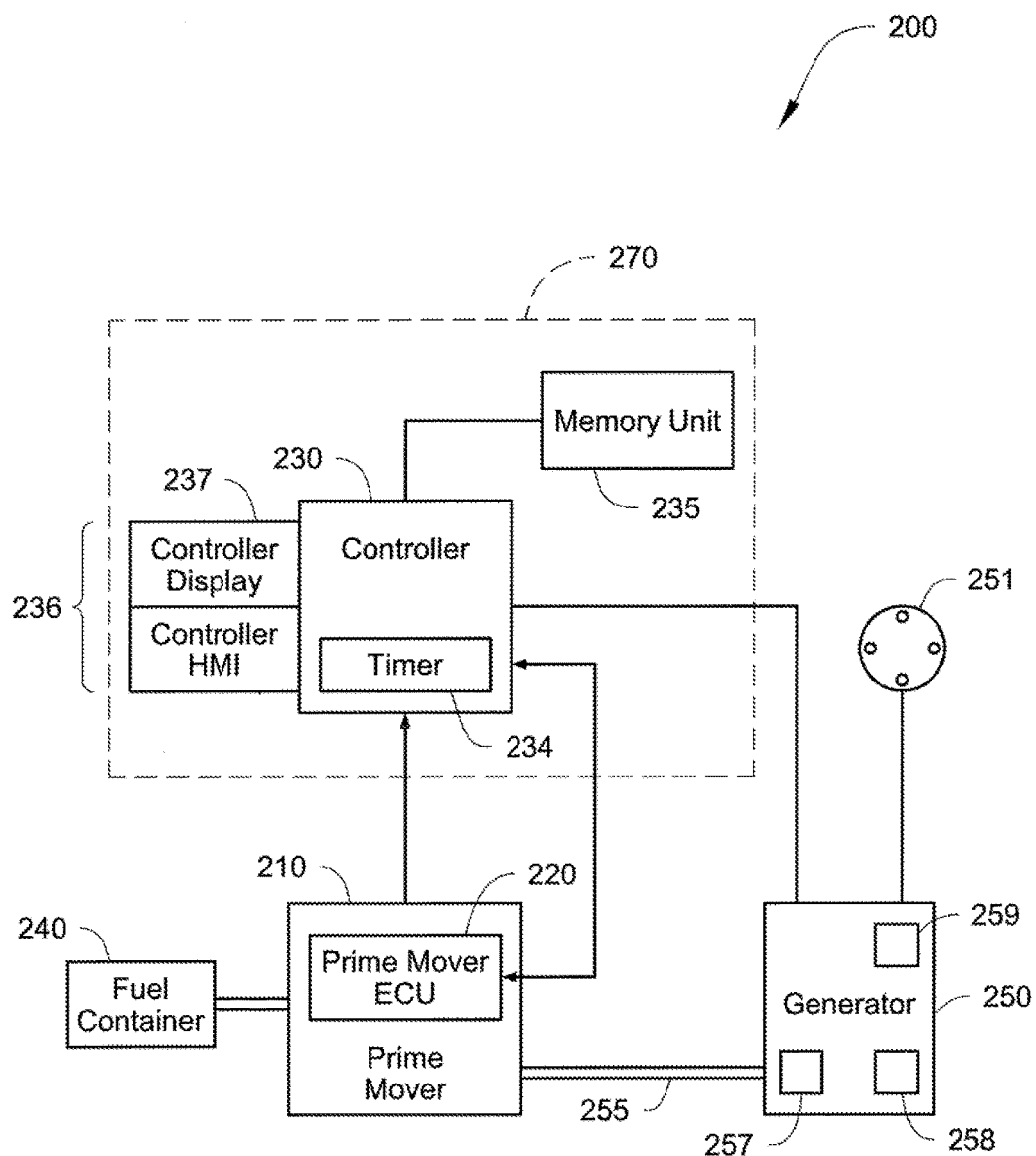
FIG. 2A is a schematic view of an embodiment of a generator set.

Referring to FIG. 1A, the generator set 112a may include a housing 170a that houses a prime mover (not shown in FIG. 1A, see the prime mover 210 in FIG. 2A) and a generator (not shown in FIG. 1A, see the generator 250 in FIG. 2A). A fuel tank 150a is configured to supply fuel to the prime mover. The housing 170a includes a human machine interface (HMI) 160a, with which a user can input, for example, commends to a controller (not shown in FIG. 1A, see the controller 230 in FIG. 2A) of the generator set. 112a.

As shown in FIG. 1A, the generator set 112a can be mounted to a chassis 130a of the transport unit 100a from a side of the chassis 130a.

As illustrated in FIG. 1B, a housing 170b of the generator set 112b can be mounted to a chassis 130b of the transport unit 100b from a bottom of the chassis 130b.

As illustrated in FIG. 1C, a housing 170c of the generator set 112c can be mounted to the front end of the transport unit 110c. A fuel tank supplying fuel to the generator set 112c may also be enclosed in the housing 170c.

The transport refrigeration system 110 can regulate various conditions temperature, humidity, etc.) in a space 122a, 122b, and 122c of the transport unit 100a, 100b and 100c respectively. In some embodiments, the transport refrigerant system 110 may be operable at a first frequency and a second frequency (e.g., ~60 Hertz and ~50 Hertz, respectively), and is defined by a closed refrigeration circuit (not shown). The closed refrigeration circuit often includes a compressor coupled to a condenser and an evaporator. In some embodiments, the generator set 112a, 112b, 112c may be configured to be operated at a plurality of speeds, such as ~1800 revolutions per minute (RPM)) and ~1500 revolutions per minute (RPM), which are corresponding to the operation frequencies (~60 Hertz and ~50 Hertz) of the transport refrigeration system 110 respectively.

It will be appreciated that the embodiments described herein may be used with trucks, trailers and container units. The embodiments described herein may be used in any other suitable temperature controlled apparatuses such as a ship board container, an air cargo cabin, an over the road truck cabin, etc. The refrigeration system may be a vapor-compressor type refrigeration system, or any other suitable refrigeration systems that can use refrigerant, cold plate technology, etc.

FIG. 2A illustrates a schematic view of an embodiment of a generator set 200, which may be configured to provide power to a transport refrigerant system, such as the transport refrigerant system 110 as shown in FIGS. 1A to 1C. The generator set 200 generally includes a prime mover 210, a prime mover electronic controller unit (ECU) 220, a controller 230, a fuel container 240 and a generator 250. The generator set 200 can be disposed in the housing 170a as shown in FIG. 1A.

The illustrated prime mover 210 may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the prime mover 210. The prime mover 210 may also be an engine that is configured specifically for a transport refrigeration system. The fuel container 240 is in fluid communication with the prime mover 210 to deliver a supply of fuel to the prime mover 210.

The prime mover 210 can be controlled by the ECU 220. The ECU 220 can be configured to regulate an amount of fuel delivered to the prime mover 210 and can be configured to operate the prime mover 210 at least at a first speed and a second speed. The ECU 220 is configured so that the prime mover 210 can be maintained at least at either the first speed or the second speed in a range of engine loads on the prime mover 210.

The ECU 220 is coupled with the controller 230. The controller 230 is configured to receive information from the ECU 220, and command the ECU 220 to vary the prime mover 210 between the first speed and the second speed. In the illustrated embodiment, the first speed is ~4800 RPM, and the second speed is ~4500 RPM. In other embodiments, the first and second speeds may be different from ~1800 RPM and ~1500 RPM.

A generator 250 can be coupled to the prime mover 210 by a flex disk 255 that transfers mechanical energy from the prime mover 210 to the generator 250. In some embodiments, the generator 250 can also be coupled to the prime mover 210 indirectly by a driving belt. The generator 250 includes a power receptacle 251 that is in electrical communication with, for example, the transport refrigeration unit 110 (as shown in FIG. 1A) via a power cable (not shown) to provide electrical power to the transport refrigeration unit 110.

The generator 250 may be an alternating current ("AC"), 3-phase generator that generally includes a rotor 257, a stator 258, and a voltage regulator 259. The rotor 257 is coupled to the flex disk 255 such that the prime mover 210 is operable to rotatably drive the rotor 257 at least at the first non-zero speed and the second non-zero speed. The stator 258 is usually a stationary component of the generator 250 that includes magnetic pole pairs (e.g., two pole pairs).

The voltage regulator 259 includes a field voltage and a field current that are generated by a regulation element (not shown) coupled to the voltage regulator 259. In some embodiments, the regulation element may include batteries or other solid-state components that generate a direct current through the voltage regulator 259. The field voltage and the field current define a field excitation. The field excitation of the generator 250 is generally considered a field of the generator 250. The field can be one part of the rotor 257 and the stator 258.

Rotation of the rotor 257 through the magnetic field induces an output current from the generator 250. The induced output current produces an output voltage of the generator 250 that is directed through the power receptacle 251 to the transport refrigeration unit 110 as shown in FIG. 1. It is to be noted that other types of generators can be used in place of the generator 250. The generator 250 as described herein is exemplary only.

The generator 250 further includes an output frequency that can be affected by the speed of the prime mover 210 or the field voltage of the generator 250. In some embodiments, the generator 250 can provide a first output frequency (e.g., ~60 Hertz) when the prime mover 210 is operated at the first speed, and can provide a second output frequency (e.g., ~50 Hertz) when the prime mover 210 is operated at the second speed. The transport refrigerant unit may be operated at both frequencies.

The output voltage of the generator 250 may be affected by the output frequency. As such, the generator 250 can provide a first output voltage in response to operation of the generator 250 at the first frequency. The generator 250 can provide a second output voltage in response to operation of the generator 250 at the second frequency. For example, when the generator 250 is operated at the first speed/frequency (e.g., ~1800 rpm/60 Hertz), the first output voltage is about 460 volts. When the generator 250 is operated at the second speed/frequency (e.g., ~1500 rpm/50 Hertz), the second output voltage is about 380 volts. Thus, the speed of the prime mover 210 can affect the frequency and output voltage of the generator 250.

The generator 250 can be configured to provide a relatively constant load capacity that is sufficient to provide power to the transport refrigeration unit under various loads. A load on the generator 250 corresponds to, for example, the cooling demand or load on the transport refrigeration unit (e.g., electrical power needed by the transport refrigeration unit), and is variable in response to changes in the load on the transport refrigeration unit.

The ECU 220 is configured to control the operation of the prime mover 210 and monitor/obtain an engine operation condition. The ECU 220 may have a microprocessor that can communicate with an array of sensors that are configured to obtain engine speed, oil temperatures piston positions, etc. By analyzing the readings from the array of sensors, the ECU 220 can obtain the operation conditions of the prime mover 210. In some embodiments, the ECU 220 can obtain the operation conditions of the prime mover 210 almost in real-time. The ECU 220 can be, for example, configured to control a fuel pump so that an amount of fuel delivered to combustion chambers of the prime mover 210 can be controlled by the ECU 220. By regulating the amount of fuel delivered, the ECU 220 can be configured to maintain the prime move 210 at an operational speed relatively constantly even when the load on the prime mover 210 may change. In the illustrated embodiment as shown in FIG. 2A, the ECU 220 is configured so that the ECU 220 can maintain the prime move 210 at least at two relatively constant operational speeds, for example ~4500 RPM and ~1800 RPM.

As described above, the controller 230 is coupled with the ECU 220. The couple between the controller 230 and the ECU 220 can be a two-way electronic communication system. The ECU 220 can be configured to obtain the engine operation conditions. The ECU 220 can then send the engine operation condition information to the controller 230.

The controller 230 may have a microprocessor that is configured to make various operating decisions in response to the engine operation condition information received from the ECU 220. The operating decisions generated by the controller 230 can then be transmitted back to the ECU 220 via the coupling between the ECU 220 and the controller 230. After receiving the operating decisions transmitted from the controller 230, the ECU 220 may then operate the prime mover 210 in accordance with the operating decisions transmitted from the controller 230.

FIG. 2A further shows that the controller 230 can be configured to be in electrical communication with a timer 234, a memory unit 235, and/or an operator interface 236. The controller 230, the timer 234, the memory unit 235 and the operator interface 236 can be incorporated into a controller panel 270.

In some embodiments, the memory unit 235 may be a Random Access Memory ("RAM") that can maintain a data log related to parameters of the prime mover 210 and the generator 250, as a well as other data.

The operator interface 236 includes a controller display 237 and a controller human machine interface (such as HMI 160a as shown in FIG. 1A) for viewing and entering commands into the controller 230. The timer 234 may separately measure a duration time that the prime mover 210 operates at the first speed, and/or a duration time that the prime mover 210 operates at the second speed.

In operation, the controller 230 and the ECU 220 can work together to operate the prime mover 210. For example, the ECU 220 can be configured to operate/maintain the prime mover 210 at the first operational speed or the second operational speed that is lower than the first operational speed. In some embodiments, for example as shown above, the first operational speed can be ~1800 RPM and the second operational speed can be ~1500 RPM.

Generally speaking, fuel efficiency changes when the operation condition of the engine changes. For example, if the load on the prime mover 210 is high, for example at about 80% of the maximum load capacity of the prime mover 210, the prime mover 210 may be more fuel efficient (i.e. consumes less fuel) at ~1800 RPM. On the other hand, if the load on the prime mover 210 is low, for example at about 20% of the maximum load capacity of the prime mover 210, the prime over 210 may be more efficient at ~1500 RPM. Therefore, controlling the operational speed based on the engine operation condition such as the load on the engine can help optimize the engine fuel efficiency and save fuel consumption.

A threshold of engine load may be determined, for example, at 50% engine load, so that if the prime mover 210 operates at an engine load that is above 50%, then the prime mover 210 may be operated at ~1800 RPM for more fuel efficiency. If the prime mover 210 operates at an engine load that is below 50%, then the prime mover 210 may be operated at ~1500 RPM for more fuel efficiency. It is to be noted that the 80%, 20% and/or 50% thresholds are exemplary. The threshold on which the prime mover 210 may switch the operational speed for more fuel efficiency can be determined, for example, by testing in a laboratory setting.

It is to be noted that the engine operation condition can be measured by parameters other than engine load. The ECU 220 can be configured to obtain other parameters correlating to the engine operation conditions and provide an engine operation condition value. Parameters that may be correlated to the engine operation condition may include shaft speed of the engine, the amount of fuel delivered to the engine, and/or air intake flow. The ECU 220 can be configured to obtain these parameters and transmit values of these parameters to the controller 230 to represent the engine operation condition value. The controller 230 can be configured to receive the engine operation condition value transmitted from the ECU 220. The relationship between the fuel efficiency and these engine operation condition parameters can be established, for example, by testing in a laboratory setting. And a threshold may be established for each parameter to help determine the optimal engine speed of the prime mover 210.

It is to be noted that the parameters obtained by the ECU 220, such as the shaft speed, the amount of fuel delivered to the engine and/or air intake flow, may be correlated to the engine load of the prime mover 210. Therefore, by monitoring these parameters, the engine load of the prime mover 210 can also be obtained.

It is to be understood that the microprocessor of the ECU 220 can be configured to calculate an engine operation condition value (such as the engine load) based on the parameters obtained by the ECU 220. For example, the amount of fuel delivered to the engine and the air intake flow are correlated to the engine load. The microprocessor of the ECU 220 can be configured to calculate the engine load based on the amount of fuel delivered and/or the air intake flow and transmit the calculated engine load to the controller 230 as the engine operation condition value. The microprocessor of the ECU 220 can also be configured to calculate engine torques, engine percent rated torque at an operational speed and/or calculated torque minus peak torque at an operational speed. etc. based on the parameters obtained by the ECU 220 and transmit these calculated values to the controller 230 as the engine operation condition value.

It is to be noted that in some embodiments, the ECU 220 can be configured to transmit values measured by the array of sensors to the controller 230. The controller 230 can be configured to determine/calculate, for example, engine load of the prime mover 210 based on the values transmitted by the ECU 220.

The memory unit 235 can be configured to store a pre-entered process. The process may be entered by an operator through the operator interface 236. Or the process may be entered into the memory unit 235 during a manufacturing process of the controller panel 270. The process contains an engine operation condition threshold that can be set, for example, by an operator or a manufacturer. The microprocessor of the controller 230 can be configured to compare the engine operation condition value received from the ECU 220 to the engine operation condition threshold stored in the memory unit 235, and make a decision on whether to switch the operating RPM of the prime mover 210. The controller 230 can be configured to send this decision back to the ECU 220 so that the ECU 220 can operate the prime mover 210 accordingly.

Figure 2B:
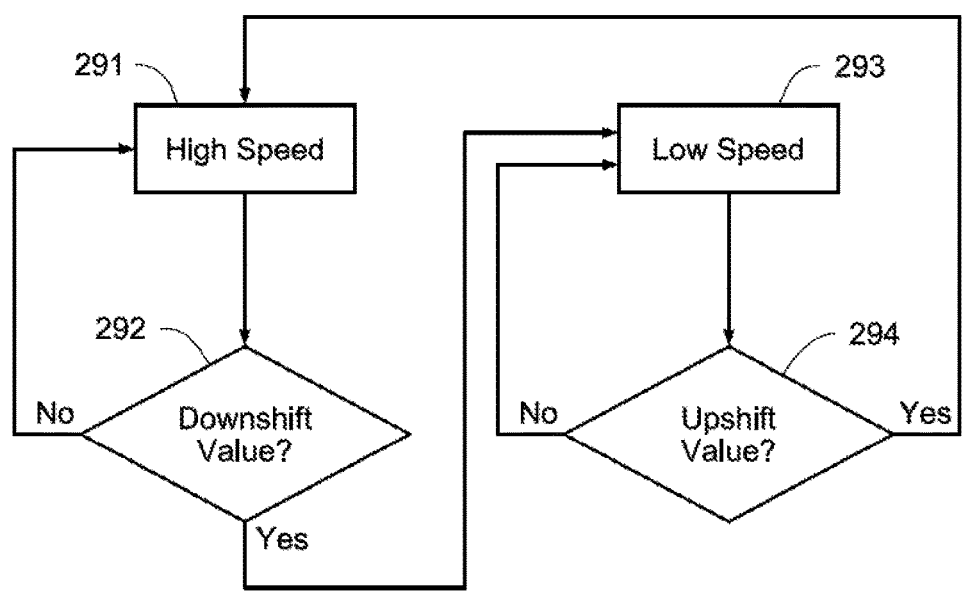
FIG. 2B is a schematic view showing a method of control decision making based on more than one threshold.

In some embodiments, the decision of the controller 230 may be based on more than one threshold. For example, as shown in FIG. 2B, in one embodiment, there is one upshift threshold value and one downshift threshold value. The decision of the controller 230 to change the engine speed can be trigged by the upshift and/or downshift shift threshold values. If the initial condition is that the engine is operated at the relatively high speed (e.g. ~1800 rpm) at 291, the controller 230 will check whether the engine operation condition value reaches the downshift threshold vale at 292. The controller 230 will instruct the engine to shift to the relatively low speed (e.g. 1500 rpm) at 293 when the engine operation condition value reaches the downshift threshold value. The engine will stay in the relatively low speed at 293 unless the upshift threshold value is reached. At 294, the controller will check whether the engine operation condition value reaches the upshift threshold value. If it does not, the engine will stay in the relatively low speed at 293. If the upshift threshold value is reached, the engine will shift to the relatively high speed at 291. The engine will stay at the relatively high speed at 291 until the downshift threshold value is reached.

In one embodiment, the upshift threshold value may be 75% full rated engine output torque, and the downshift threshold value may be 50% full rated engine output torque. It is to be appreciated that the upshift threshold value and/or the downshift threshold value can be other parameters/values.

The decision made by the controller 230 may be transmitted to the ECU 220 by various methods. For example, the microprocessor of the controller 230 may interpret the decision by outputting different voltage signals. For example, if the decision of the more efficient RPM for the prime mover 210 is at the first operational speed (e.g. the relatively high speed, ~1800 rpm), the microprocessor of the controller 230 is configured to output a first voltage signal. Likewise, if the decision of the more efficient RPM for the prime mover 210 is at the second operational speed (e.g. the relatively low speed. ~1500 rpm), the microprocessor of the controller 230 is configured to output a second voltage signal. The first and the second voltage signals can be transmitted to the ECU 220.

The ECU 220 can be configured to measure the voltage signals received from the controller 230. When a first voltage signal is received, the microprocessor of the ECU 220 can be configured to adjust the prime mover 210 to operate at the first operational speed. When a second voltage signal is received, the microprocessor of the ECU 220 can be configured to adjust the prime mover 210 to operate at the second operational speed. The ECU 220 can be configured to monitor the voltage output of the controller 230 continuously or at a constant interval. The ECU 220 is configured to maintain the prime mover 210 at the operational speed until the ECU 220 receives a voltage signal from the controller 230 corresponding to the operational speed that is different from the operating speed of the prime mover 210. The ECU 220 may then be configured to adjust the prime mover 210 so that the prime mover 210 can be switched to the other operational speed.

When the prime mover 210 operates at the first operational speed, the generator 250 operates at the first frequency and provides the first output voltage. When the prime mover 210 operates at the second operational speed, the generator 250 operates at the second frequency and provides the second output voltage. Under normal operating conditions, the prime mover 210 operates at the first operational speed or the second operational speed such that the frequency and/or the output voltage provided by the generator 250 remain relatively constant.

It is to be appreciated that the ECU 220 can be configured to obtain other parameters of the engine operation condition and transmit the values to the controller 230. For example, the ECU 220 can be configured to receive an exhaust gas temperature measured by a temperature sensor positioned in an exhaust of the prime mover 210. It is to be noted that in some embodiments, the controller 230 may be configured to receive the exhaust gas temperature directly. The controller 230 can then determine the operating speed of the prime mover 210 operating speed based on the exhaust temperature.

Figure 3:
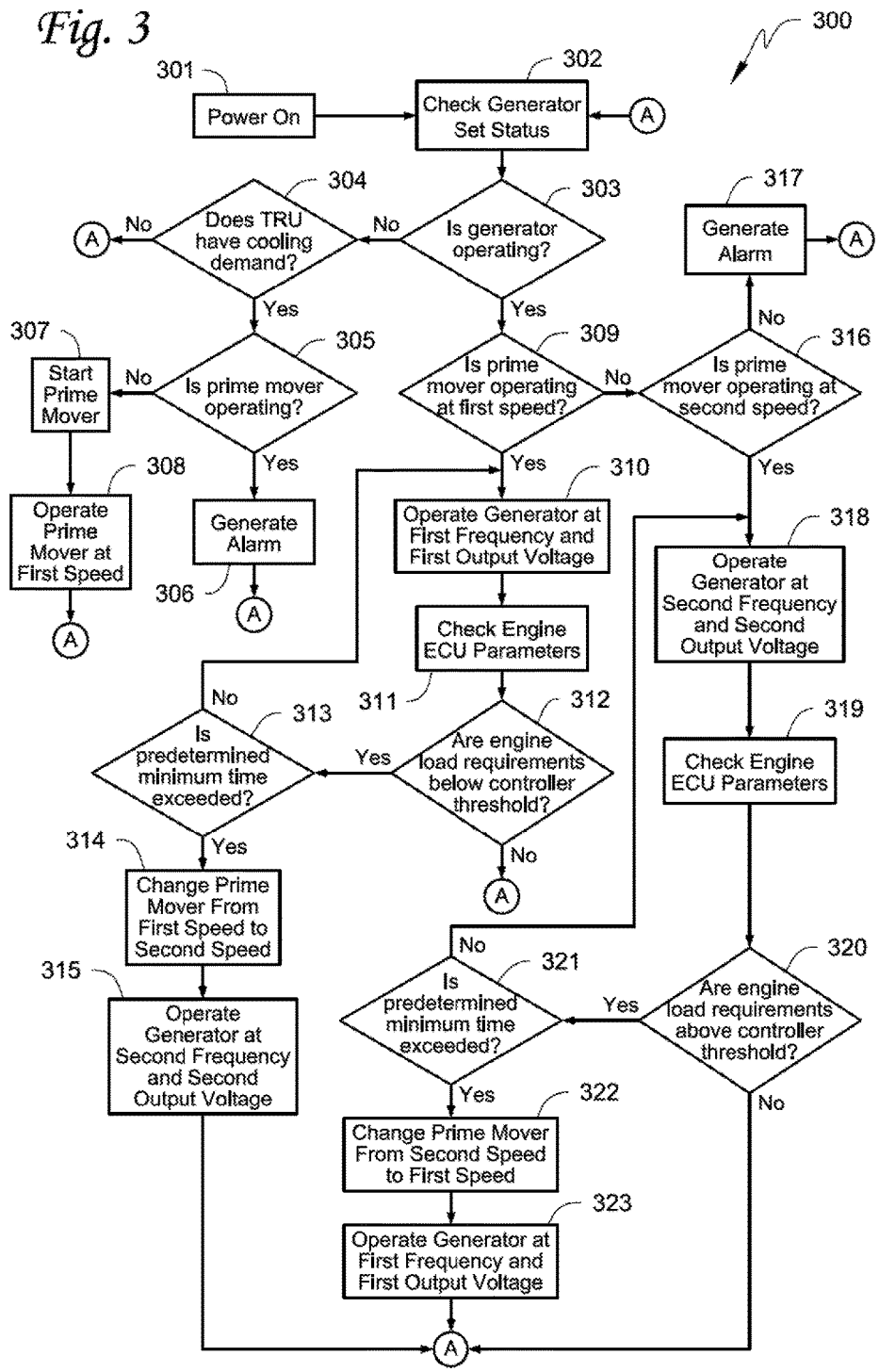
FIG. 3 is a flow chart of a method of operating a controller of the generator set as shown in FIG. 2A.

FIG. 3 shows one embodiment of a process 300 by which the controller 230 as shown in FIG. 2A can be operated. As discussed above, the process may be stored in the memory unit 235 as shown in FIG. 2A.

After the controller 230 is turned on at 301, the controller 230 checks the status of the generator set 250 at 302. At 303, the controller 230 determines whether the generator 250 is operating. Under normal operating conditions, the generator 250 is operating when the generator 250 is "ON." If the answer at 303 is "No," (i.e., the generator 250 does not have power or is in an "Off" state), the controller 230 determines at 304 whether the transport refrigeration unit 110 as shown in FIGS. 1B and 1C has a non-zero cooling demand or load. If the answer at 303 is "No," the transport refrigeration unit 110 does not need electrical power from the generator set 250 and the process returns to 302. (In FIG. 3, the process is connected to 302 at Ⓐ.)

If the transport refrigeration unit 110 is subjected to a cooling demand or load (i.e., the answer at 304 is "Yes"), the controller 230 checks whether the prime mover 210 is operating at 305. If the prime mover 305 is "ON" or operating (i.e., the answer at 305 is "Yes"), an alarm is generated at 306. The alarm signals to an operator that the generator 250 is not adequately providing electrical power to the transport refrigeration unit 110 because no electrical power is being supplied by the generator 250 when the prime mover 210 is operating at one of the first speed and the second speed. Once the alarm is generated at 306, the process returns to 302.

The controller 230 starts the prime mover 210 at 307 if the answer at 305 is "No." After initial startup of the prime mover 210, the controller 230 sends the decision that the prime mover 210 is to be operated at the first speed to the ECU 220. The process then returns to 302.

If the generator 250 is "ON" at 303 (i.e., the answer at 303 is "Yes"), the controller 230 determines whether the prime mover 210 is operating at the first speed at 309. The controller 230 can receive the information about the operating speed of the prime mover 210 from the ECU 220. At 310, the generator 250 is operated at the first frequency and provides the first output voltage when the prime mover 210 operates at the first speed at 309 (i.e., the answer at 309 is "Yes"). At 311, the controller 230 then checks the engine operation condition value, such as the amount of fuel delivered, the air intake flow and/or engine operation condition value, sent by the ECU 220. At 312, the controller 230 compares the engine operation condition value sent by the ECU 220 with an engine operation condition threshold. The process returns to 302 if the engine operation condition value is above the engine operation condition threshold (i.e., the answer at 312 is "No").

If the generator 250 is operating at an engine operation condition value that is below the engine operation condition threshold (i.e., the answer at 312 is "Yes"), the controller 230 determines whether the prime mover 210 has operated below the engine operation condition threshold for a minimum time at 313 using the timer 234 as shown in FIG. 2A. In some embodiments, the minimum time can be ~30 minutes. In some other embodiments, the minimum time can be less or more than ~30 minutes. If the prime mover 210 has operated below the engine operation condition threshold for less than the minimum time at 313, the prime mover 210 continues to operate at the first speed, and the generator 250 continues to operate at the first frequency and the first output voltage at 310.

The controller 230 makes the decision of whether to change the prime mover 210 from the first speed to the second speed at 314 if the prime mover 210 has operated below the engine operation condition threshold in excess of the minimum time at 313. If the controller 230 makes the decision to switch operating speeds, the decision made by the controller 230 is then instructed to the ECU 220, and the ECU 220 can operate the prime mover 210 according to the instruction of the controller 230. Once the prime mover 210 has changed to the second speed, the generator 250 operates at the second frequency and the second output voltage at 315. The process then returns to 302.

At 309, if the prime mover 210 is not operated at first speed (i.e., the answer at 309 is "No"), the process proceeds to 316. The controller 230 determines whether the prime mover 210 is operating at the second speed at 316. The controller 230 generates an alarm at 317 when the prime mover 210 is not operating at about the first speed or the second speed. The process then returns to 302.

The controller 230 operates the generator 250 at the second frequency and the second output voltage at 318 if the prime mover 210 is operating at the second speed at 316. At 319, the controller 230 receives the engine operation condition value of the prime mover 210 from the ECU 220. At 320, the controller 230 determines whether the engine operation condition threshold has been reached.

The process returns to 302 if the engine operation condition value is not above the engine operation condition threshold at 320 (i.e., the prime mover 210 continues to operate at the second speed and the generator 250 continues to provide the second frequency and the second output voltage). If the engine operation condition value is above the engine operation condition threshold at 320, the controller 230 determines at 321 whether the prime mover 210 has operated above the engine operation condition threshold in excess of a minimum time using the timer 234. The minimum time at 321 can be the same as or different from the minimum time discussed with regard to 313. If the time that the prime mover 210 has operated below the engine operation condition threshold does not exceed the minimum time at 321, the prime mover 210 continues to operate at the second speed, and the generator 250 continues to provide the second frequency and the second output voltage at 318.

The controller 230 makes the decision to change the prime mover 210 from the second speed to the first speed at 322 if the time that the generator 250 has operated below the engine operation condition threshold exceeds the minimum time at 321. The decision to switch the operating speed is then sent to ECU 220 to execute. Once the prime mover 210 has changed to the first speed, the generator 250 operates at the first frequency and the first output voltage at 323. The process then returns to 302.

In general, the controller 230 selectively operates the prime mover 210 at one of the first speed and the second speed in response to the engine information received from the ECU 230. Generally, the first speed is higher than the second speed. The prime mover 210 operates at the first speed when the engine operation condition value is above the engine operation condition threshold, which is generally related to a situation where the refrigeration system 110 requires more power to generate heat or cold and the engine load on the prime mover 210 is relatively high. The prime mover 210 is relative more efficient at the first speed if the engine load of the prime mover 210 is relatively high. The prime mover 210 operates at the second speed when the engine operation condition value is below the engine operation condition threshold, which is generally related to a situation where the refrigeration system 110 only requires minimal power to maintain the temperature of the space 120 and the engine load on the prime mover 210 is relatively low. The prime mover 210 is generally more efficient at the second speed if the engine load of the prime mover 210 is relatively low.

It is to be appreciated that the coupling between the controller 230 and the ECU 220 may be accomplished with data cables. Iii some embodiments, the communication between the controller 230 and the ECU 220 may be accomplished wirelessly.

By using the engine condition monitored by the ECU 220, and/or the engine information provided by the ECU 220, such as engine operation condition values of the prime mover 210, the decision of whether to switch the operational speed of the prime mover 210 can be made almost instantly based on the engine condition. Therefore, the prime mover 210 can be controlled effectively based on its condition. This can help reduce unnecessary fuel consumption and increase the fuel efficiency of the prime mover 210.

It is to be appreciated that information, such as the engine operation condition values, may also be communicated between the controller and the ECU wirelessly. The ECU may also communicate with the array of sensors wirelessly.

Aspects

It is noted that any aspects 1-5 below can be combined with any aspects 6-8, and any aspects 9-14. Any aspects 6-8 can be combined with any aspects 9-14.

1. A method of operating a prime mover of a generator set comprising:
   obtaining an engine operation condition value of the prime mover;
   comparing the engine operation condition value of the prime mover with an engine operation condition threshold;
   instructing the prime mover to operate at a first operating speed when the engine operation condition value of the engine exceeds the engine operation condition threshold; and
   instructing the prime mover to operate at a second operating speed that is lower than the first operating speed when the engine operation condition value of the engine is less than the engine operation condition threshold.
2. The method of aspect 1, further comprising an electronic control unit of the engine obtaining the engine operation condition value of the prime mover.
3. The method of aspects 1-2, further comprising the electronic control unit transmitting the engine operation condition value of the prime mover to a controller.
4. The method of aspects 1-3, wherein the engine operation condition value of the prime mover is at least one of an amount of fuel delivered to the engine, an air intake flow, or a shaft speed of the engine.
5. The method of aspects 1-4, wherein the engine operation condition value of the prime mover is an engine load of the prime mover.
6. A generator set comprising:
   an engine with an electronic control unit; and
   a controller:
   wherein the electronic control unit is configured to provide an engine operation condition value, and the controller is configured to generate an engine operation instruction based on the engine operation condition value; and
   wherein when the engine operation condition value exceeds an engine operation condition threshold, the controller is configured to instruct the electronic control unit to operate the engine at a first speed, and
   when the engine operation condition value is less than the engine operation condition threshold, the controller is configured to instruct the electronic control unit to operate the engine at a second speed that is lower than the first speed.
7. The generator set of aspect 6, wherein the engine operation condition value of the engine is at least one of an amount of fuel delivered to the engine, an air intake flow, or a shaft speed of the engine.
8. The generator set of aspect 6-7, wherein the engine operation condition value of the engine is an engine load of the engine.
9. A method of operating a prime mover of a generator set comprising:
   obtaining an engine operation condition value of the prime mover;
   comparing the engine operation condition value of the prime mover with an upshift engine operation condition threshold;
   instructing the prime mover to operate at a first operating speed when the engine operation condition value of the prime mover exceeds the upshift engine operation condition threshold;
   comparing the engine operation condition value of the prime mover with a downshift engine operation condition threshold; and
   instructing the prime mover to operate at a second operating speed that is lower than the first speed when the operation condition value of the prime mover is less than the downshift engine operation condition threshold.
10. The method of aspect 9, further comprising:
    maintaining the prime mover at the first operating speed when the engine operation condition value of the prime mover is lower than the upshift engine operation condition threshold.
11. The method of aspects 9-10, further comprising:
    maintaining the prime mover at the second operating speed when the engine operation condition value of the prime mover is higher than the upshift engine operation condition threshold.
12. The method of aspects 9-11, wherein the engine operation condition value of the prime mover is an engine load of the prime mover.
13. The method of aspects 9-12, wherein the engine operation condition value of the prime mover is at least one of an amount of fuel delivered to the engine, an air intake flow, or a shaft speed of the engine.
14. The method of aspects 9-13, further comprising an electronic control unit of the engine obtaining the engine operation condition value of the prime mover.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:
1. A method of operating a prime mover of a generator set comprising:

a controller receiving an engine operation condition value of the prime mover from an electronic control unit of the prime mover;

the controller comparing the engine operation condition value of the prime mover with an engine operation condition threshold;

the controller instructing the electronic control unit of the prime mover to adjust an operating speed of the prime mover based on the comparison of the engine operation condition value with the engine operation condition threshold.

2. The method of claim 1, wherein the engine operation condition value of the prime mover is one of an amount of fuel delivered to the engine, an air intake flow, or a shaft speed of the engine.

3. The method of claim 1, wherein the engine operation condition value of the prime mover is an engine load of the prime mover.

4. The method of claim 1, further comprising:
the controller instructing the electronic control unit of the prime mover to change the operating speed of the prime mover from a first operating speed to a second operating speed when the controller determines that the engine operation condition value of the prime mover is below the engine operation condition threshold for a first minimum tune period.

5. The method of claim 1, further comprising:
the controller instructing the electronic control unit of the prime mover to change the operating speed of the prime mover from a first operating speed to a second operating speed when the controller determines that the engine operation condition value of the prime mover is above the engine operation condition threshold for a second minimum time period.

6. The method of claim 1, wherein the engine operation condition threshold is a first value when the prime mover is operating at a first operating speed and is a second value when the prime mover is operating at a second operating speed.

7. A generator set comprising:
a prime mover with an electronic control unit; and
a controller;
wherein the controller receives an engine operation condition value of the prime mover from the electronic control unit, compares the engine operation condition value of the prime mover with an engine operation condition threshold, and instructs the electronic control unit of the prime mover to adjust an operating speed of the prime mover based on the comparison of the engine operation condition value with the engine operation condition threshold.

8. The generator set of claim 7, wherein the engine operation condition value of the engine is one of an amount of fuel delivered to the engine, an air intake flow, or a shaft speed of the engine.

9. The generator set of claim 7, wherein the engine operation condition value of the engine is an engine load of the engine.

10. The generator set of claim 7, further comprising:
a generator;
wherein the electronic control unit controls operation of the engine and monitors and obtains the engine operation condition value, and
wherein the controller communicates with the electronic control unit, monitors an operation status of the generator, and monitors and controls operation of the generator set.

11. The generator set of claim 7, wherein the electronic control unit includes a processor and sends the engine operation condition value of the prime mover to the controller, and
wherein the controller includes a processor and compares the engine operation condition value of the prime mover with the engine operation condition threshold to generate an engine operation instruction for the electronic control unit of the prime mover.

12. The generator set of claim 7, wherein the engine operation condition threshold is a first value when the prime mover is operating at a first operating speed and is a second value when the prime mover is operating at a second operating speed.

13. The generator set of claim 7, further comprising a controller panel that includes:
the controller,
a memory unit connected to the controller,
a timer incorporated into the controller, and
an operator interface connected to the controller.

14. A method of operating a prime mover of a generator set comprising:
a controller receiving an engine operation condition value of the prime mover;
the controller comparing the engine operation condition value of the prime mover with an upshift engine operation condition threshold;
the controller instructing the electronic control unit of the prime mover to adjust an operating speed of the prime mover based on the comparison of the engine operation condition value with the upshift engine operation condition threshold;
the controller comparing the engine operation condition value of the prime mover with a downshift engine operation condition threshold; and
the controller instructing the electronic control unit of the prime mover to adjust an operating speed of the prime mover based on the comparison of the engine operation condition value with the downshift engine operation condition threshold.

15. The method of claim 14, further comprising:
maintaining the prime mover at a first operating speed when the engine operation condition value of the prime mover is lower than the upshift engine operation condition threshold.

16. The method of claim 14, further comprising:
maintaining the prime mover at a second operating speed when the engine operation condition value of the prime mover is higher than the upshift engine operation condition threshold.

17. The method of claim 14, wherein the engine operation condition value of the prime mover is one of an amount of fuel delivered to the engine, an air intake flow, or a shaft speed of the engine.

18. The method of claim 14, wherein the engine operation condition value of the prime mover is an engine load of the prime mover.

19. The method of claim 14, wherein the upshift engine operation condition threshold is a first percentage full rated engine output torque, and the downshift engine operation condition threshold is a second percentage full rated engine output torque,
wherein the first percentage full rated engine output torque is greater than the second percentage full rated engine output torque.

20. The method of claim 14, further comprising:
the controller calculating an engine load of the prime mover based on the engine operation condition value of the prime mover.

* * * * *